United States Patent [19]

Adams et al.

[11] Patent Number: 4,857,227

[45] Date of Patent: Aug. 15, 1989

[54] LIQUID CRYSTAL MIXTURES HAVING WIDENED SMECTIC TEMPERATURE RANGE

[75] Inventors: Timothy G. Adams, Allston; Roger F. Sinta, Woburn, both of Mass.

[73] Assignee: Polaroid Corporation Patent Department, Cambridge, Mass.

[21] Appl. No.: 69,172

[22] Filed: Jul. 2, 1987

[51] Int. Cl.[4] ............... C09K 19/12; C09K 19/52; G02F 1/13
[52] U.S. Cl. ................ 252/299.65; 252/299.01; 350/350 S
[58] Field of Search ............. 252/299.01, 299.65; 350/350 S

[56] References Cited

U.S. PATENT DOCUMENTS

| | | | |
|---|---|---|---|
| 4,090,975 | 5/1978 | Aldrich et al. | 252/299.01 |
| 4,576,732 | 3/1986 | Isogai et al. | 252/299.65 |
| 4,613,209 | 9/1986 | Goodby et al. | 350/350 S |
| 4,710,585 | 12/1987 | Taguchi et al. | 252/299.65 |
| 4,728,458 | 3/1988 | Higuchi et al. | 252/299.65 |
| 4,737,313 | 4/1988 | Saito et al. | 252/299.65 |
| 4,753,752 | 6/1988 | Raynes et al. | 252/299.65 |
| 4,769,176 | 9/1988 | Bradshaw et al. | 252/299.65 |
| 4,780,242 | 10/1988 | Miyazawa et al. | 252/299.65 |

FOREIGN PATENT DOCUMENTS

| | | |
|---|---|---|
| 0188222 | 7/1986 | European Pat. Off. . |
| 0191600 | 8/1986 | European Pat. Off. . |
| 219958 | 4/1987 | European Pat. Off. ....... 252/299.65 |

OTHER PUBLICATIONS

G. Decobert et al., in Mol. Cryst. Liq. Cryst. 1984, vol. 114, pp. 237-247, Synthesis and Mesomorphysm of Some New Ferro-Electric Smectic Liquid Crystals.

N. A. Clark, et al., in Appl. Phys. Lett. 36 (11) 1 Jun. 1980; Submicrosecond Bistable Electro-Optic Switching in Liquid Crystals.

J. W. Goodby et al., in Liquid Crystal and Ordered Fluids, edited by A. C. Griffin and J. F. Johnson, Plenum Press, vol. 4, pp. 1-32 (1984).

T. Kitamura, et al., "Study of New Liquid Crystal Materials (11): Synthesis and Mesomorphic Properties of Alkoxymethylene Substituted Phenyl Cyclohexanecarboxylates", Mol. Cryst. Liq. Cryst. 1984, vol. 112, pp. 319-324.

T. Kitamura, et al., "Synthesis and Physical Properties of Alkoxymethylene Substituted Phenyl Cyclohexanecarboxylates", Mol. Cryst. Liq. Cryst., 1985, vol. 130, pp. 231-427.

*Primary Examiner*—Teddy S. Gron
*Assistant Examiner*—J. E. Thomas
*Attorney, Agent, or Firm*—Louis G. Xiarhos

[57] ABSTRACT

Mixtures of liquid crystal compounds from among different classes of liquid crystal ester compounds are disclosed. The mixtures exhibit freezing points substantially lower than the freezing point of either ester compound alone, so as to provide a substantially improved (widened) smectic C mesomorphic temperature range and protection against freezing or crystallization of liquid crystal material over a range of temperatures at which an electrooptic display device would typically be operated.

9 Claims, 2 Drawing Sheets

LIQUID CRYSTAL MIXTURES HAVING WIDENED SMECTIC TEMPERATURE RANGE

BACKGROUND OF THE INVENTION

This invention relates to ferroelectric liquid crystal compounds of the smectic type. More particularly, it relates to mixtures of smectic liquid crystal compounds which exhibit a ferroelectric, chiral smectic C phase and which find application in electrooptic display devices.

The utilization of the properties of a ferroelectric smectic phase to effect a switching phenomenon in an electrooptic display device has been known and is described by N. A. Clark and S. T. Lagerwall in App. Phys. Lett. 36, 899 (1980). Such devices operate with low electric power consumption while providing a more rapid switching than is realized in electrooptic display devices dependent upon the properties of liquid crystals of the nematic type. Display devices of the ferroelectric type rely upon two tilted configurations of smectic liquid crystal molecules to provide two states of equal energy. Switching from one state to the other is accomplished by moving a boundary between the two domains by applying an electric field across a pair of electrodes sandwiching a layer of the ferroelectric liquid crystal material.

Various liquid crystal compounds of the ferroelectric smectic type have been reported and examples of such compounds are set forth, for example, by G. Decobert and J. C. Dubois in Mol. Cryst. Liq. Cryst., 1984, 114, 237–247; by J. W. Goodby and T. M. Leslie, in Liquid Crystals and Ordered Fluids, Edited by A. C. Griffin and J. F. Johnson, Plenum Press, Vol. 4, pp. 1–32; and in European Patent Application 0110299 A2, published June 13, 1984. In the aforementioned European Patent Application 0110299 A2, it is indicated that the appearance of ferroelectricity in a molecular structure is dependent upon two conditions - the presence of an optically active group and the presence of an electric dipole in a direction approximately perpendicular to the major axis of the liquid crystal molecule, to induce spontaneous polarization. In general, it is well recognized that the suitability and operating efficiency of an electrooptic device will be dependent upon the chemical structure of a liquid crystal compound employed therein and that such properties will be influenced by such molecular factors as rigidity or stiffness, morphology, crystallinity and intermolecular forces.

In the formulation of liquid crystal-containing compositions for use in electrooptic devices, it has been common to formulate mixtures of two or more liquid crystal compounds to provide one or more properties superior to that attainable from a single liquid crystal compound. In the case of nematic liquid crystal compounds, mixtures of different classes of nematic liquid crystal compounds to provide compositions having wider nematic temperature ranges, have been described, for example, in U.S. Pat. No. 4,090,975 (issued May 23, 1978 to R. E. Aldrich, et al.). Similarly, in the aforementioned European Patent Application 0110299 A2, there are disclosed mixtures of ferroelectric smectic liquid crystal compounds to provide compositions showing a lowered melting point and a thermodynamically stable smectic C phase in a temperature range including room temperature.

In formulating mixtures of liquid crystal compounds for improved properties, an improvement in one property is oftentimes accompanied by an adverse affect on another desired property. For example, a lowering in smectic freezing point resulting from an admixture of smectic liquid crystal compounds may be accompanied by an undesired lowering of the isotropic transition temperature which tends to negate the advantage of the lowered freezing. In other instances, improvement (widening) of mesomorphic temperature range will be minimal. The properties achievable by a combination of liquid crystal compounds will typically be largely unpredictable.

SUMMARY OF THE INVENTION

It has been found that an unexpected and substantial widening of smectic C mesomorphic temperature range can be realized by combining liquid crystal compounds from among different classes of the formulas

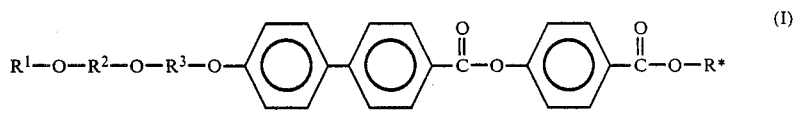

and

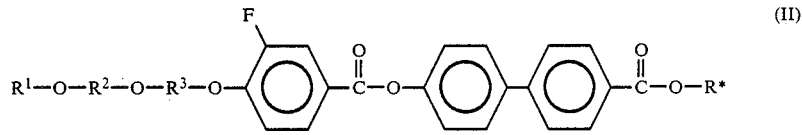

wherein, in each formula, $R^1$ is a straight- or branched-chain alkyl group, each of $R^2$ and $R^3$ is a divalent alkylene radical and $R^*$ is an optically active group containing an asymmetric center.

In general, a liquid crystal composition of the invention comprises a mixture of liquid crystal compounds from the formula (I) and formula (II) classes wherein the ratio of the formula (I) compound to formula (II) compound is in a molar ratio of from about 98:2 to about 60:40. Such a mixture exhibits a freezing point substantially lower than the freezing point of either compound alone, so as to provide a substantially improved (widened) smectic C mesomorphic temperature range and protection against freezing or crystallization of liquid crystal material over a range of temperatures at which an electrooptic display device would typically be operated.

DETAILED DESCRIPTION OF THE INVENTION

Figure 1:
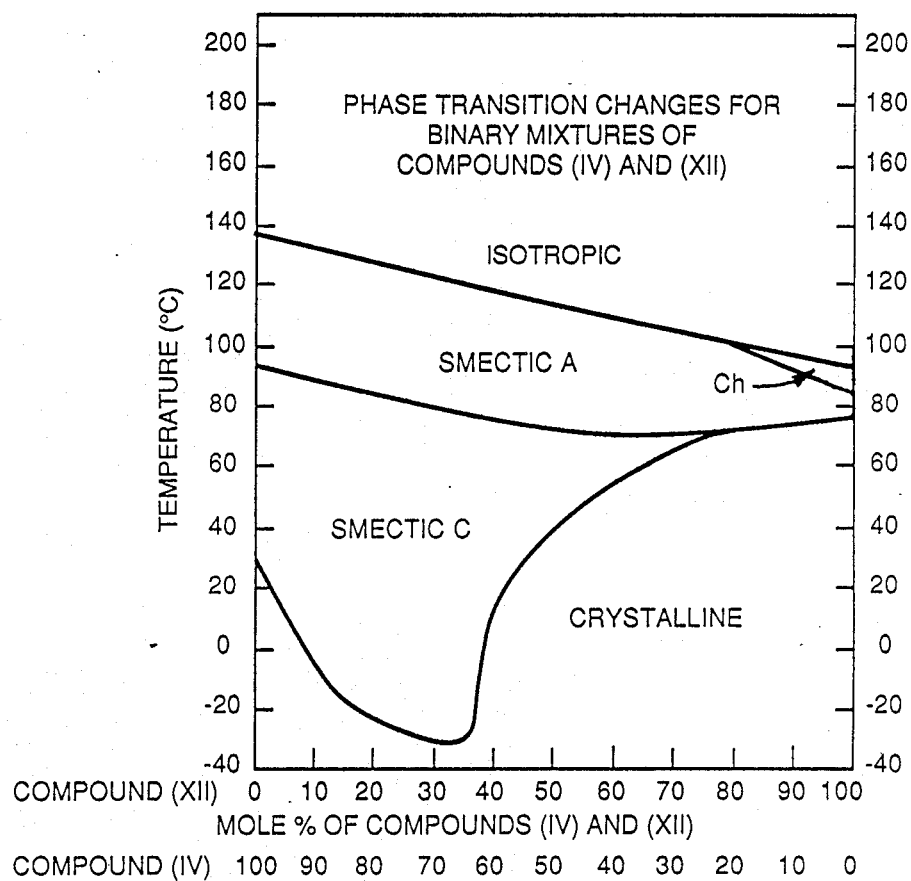
FIG. 1 shows a phase diagram for a mixture of two liquid crystal compounds.

Liquid crystal compositions of the present invention comprise mixtures of liquid crystal compounds from the aforedescribed classes. Inspection of formulas (I) and (II), as follows, will show the compounds of the mixtures to be selected from classes of ester compounds:

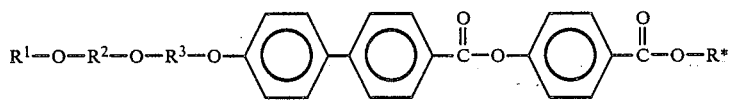
(I)

and

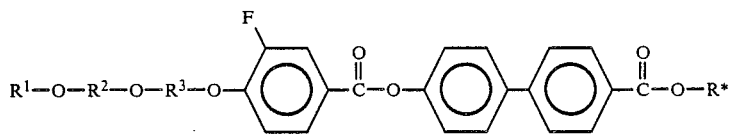
(II)

Each of the classes of compounds can be seen to comprise, respectively, an ester-containing core segment,

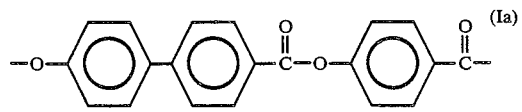
(Ia)

or

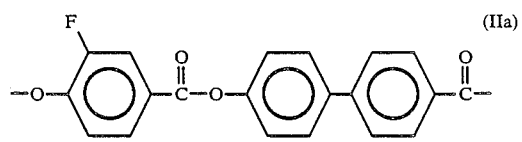
(IIa)

Each of the classes of compounds contains an ether tail moiety $R^1$—O—$R^2$—O—$R^3$— appended at one end of the core segment and an optically active moiety —$R^*$ containing an asymmetric center. For convenience, the ether tail moiety and the oxygen atom of the core segment to which such moiety is bonded can be referred to as a triether tail.

In the formula (I) liquid crystal esters, $R^1$ represents a straight- or branched-chain alkyl group. The alkyl can vary in length and typically will contain from 1 to about 6 carbon atoms. Suitable alkyl groups include methyl, ethyl, n-propyl, isopropyl, n-butyl and n-hexyl. Preferred $R^1$ groups have from 1 to 4 carbon atoms and include ethyl and n-butyl. Each of $R^2$ and $R^3$ represents a divalent alkylene radical (e.g., methylene or 1,2-ethylene). Preferably, $R^2$ and $R^3$ will have up to two carbon atoms. $R^2$ and $R^3$ can be the same or different, although from the standpoint of synthetic considerations, it will be preferred that $R^2$ and $R^3$ be the same. Preferably, each of $R^2$ and $R^3$ will be the 1,2-ethylene radical and will typically be introduced into the compound via a conventional ethoxylation route.

The formula (I) liquid crystal compounds contain a chiral tail moiety

—$R^*$ attached to the terminal bond of the formula (Ia) core radical. This tail moiety contains an essential asymmetric center. Typically, the optical active group will be an alkyl group having an asymmetric carbon atom such as is represented by the formula (III)

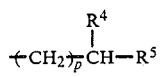
(III)

wherein p is zero or an integer from 1 to 8 and wherein each of $R^4$ and $R^5$ is alkyl (e.g., methyl or ethyl), halogen (e.g., chloro or bromo), alkoxy (e.g., methoxy, ethoxy) or alkoxyalkyl (e.g., 2-ethoxyethyl or 2-butoxyethyl), provided that $R^4$ and $R^5$ are different from each other. Preferably p will be zero or one and each of $R^4$ and $R^5$ will be dissimilar normal-alkyl groups. Suitable examples of chiral tail moieties include —CH$_2$—$\overset{\underset{\displaystyle CH_3}{|}}{CH}$—CH$_2$—CH$_3$, i.e., 2-methylbutyl;

and

—$\overset{\underset{\displaystyle CH_3}{|}}{CH}$—(CH$_2$)$_5$—CH$_3$, i.e., the 2-octyl group. Other groups having an asymmetric carbon atom can be employed, although the 2-octyl and 2-methylbutyl groups will be preferred from the standpoints of ready availability of starting materials and ease of preparative routes.

In the formula (II) liquid crystal esters, each of $R^1$, $R^2$, $R^3$ and $R^*$ has the same meaning as set forth in connection with the formula (I) liquid crystal esters. In formulating a mixture of formula (I) and formula (II) esters, the respective $R^1$, $R^2$, $R^3$ and $R^*$ moieties can be the same or different.

The formula (I) liquid crystal ester compounds can be prepared by a catalyzed esterification reaction according to the following reaction sequence:

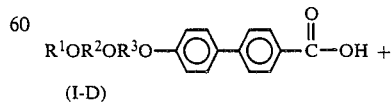
(I-D)

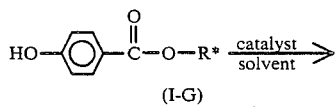
(I-G)

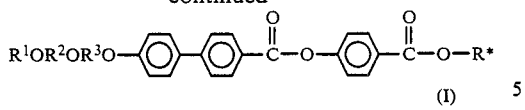

(I)

wherein each of $R^1$, $R^2$, $R^3$ and $R^*$ have the meanings previously defined. The esterification can be accomplished in an organic solvent such as dichloromethane ($CH_2Cl_2$) using the known esterification catalysts, 4-dimethylaminopyridine and 1-(3-dimethylaminopropyl)-3-ethylcarbodiimide hydrochloride. The formula (I) liquid crystal ester can be recovered, recrystallized and used in the formulation of the mixtures of the invention.

The starting reactant represented by the formula (I-D) can be prepared, for example, by reaction of a halo (alkoxyalkoxy)alkane (I-A) with an alkyl 4-hydroxy-4-biphenyl carboxylate ester (I-B), using a solvent such as dimethylformamide and potassium carbonate and potassium iodide, followed by hydrolysis using aqueous sodium hydroxide and acidification with hydrochloric acid as illustrated by the following reaction scheme wherein X represents halo, such as bromo, and R is alkyl, such as methyl:

(I-A)

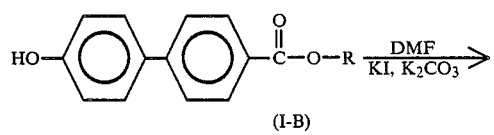

(I-B)

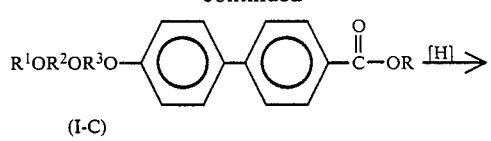

(I-C)

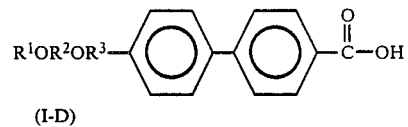

(I-D)

The starting reactant represented by formula (I-G) can be conveniently prepared by reaction of 4-hydroxybenzoic acid (I-E) with an alcohol, formula (I-F), having an asymmetric center, represented as $R^*$-OH, using a solvent such as toluene and a catalyst such as p-toluenesulfonic acid dihydrate:

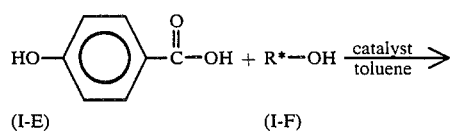

(I-E)  (I-F)

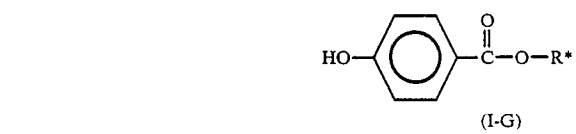

(I-G)

Formula (I) liquid crystal esters and methods for their preparation are described in the copending and commonly assigned application of William J. Cumming, et al, U.S. Patent application Ser. No. 061,072, filed June 23, 1987.

Examples of Formula (I) liquid crystal esters useful in the formulation of mixtures according to the present invention include the following:

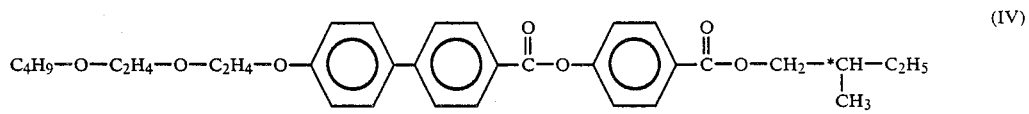

(IV)

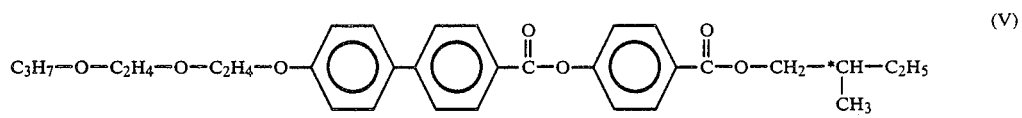

(V)

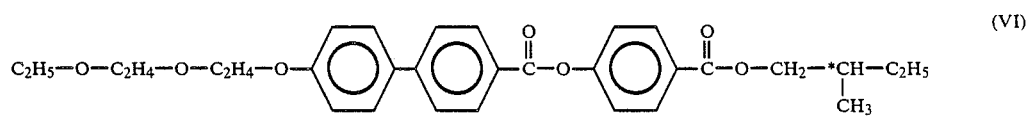

(VI)

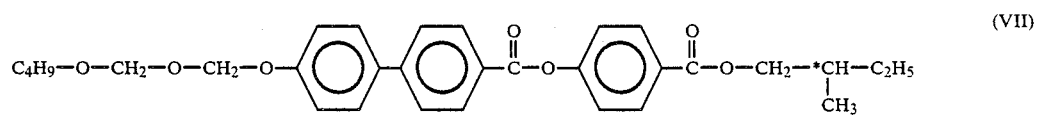

(VII)

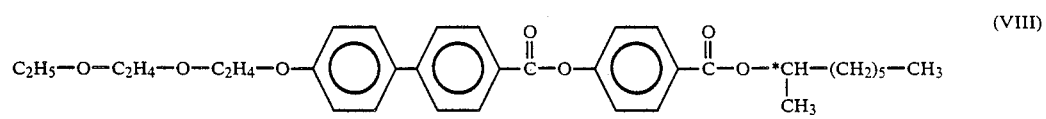

(VIII)

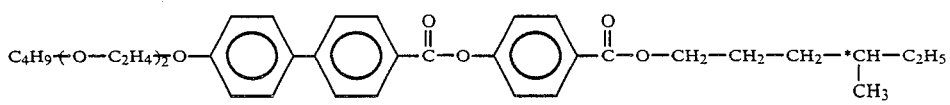

The formula (II) liquid crystal ester compounds can be prepared by an esterification reaction in a manner substantially as described for the formula (I) esters, except by reaction of different starting compounds. Thus, the formula (II) esters can be prepared by reaction of a 3-fluoro-4-(alkoxyalkoxyalkoxy)-benzoic acid, represented as formula (II-C) with a chiral ester of 4-hydroxy-4'-biphenylcarboxylic acid, represented by formula (II-J), according to the following reaction scheme:

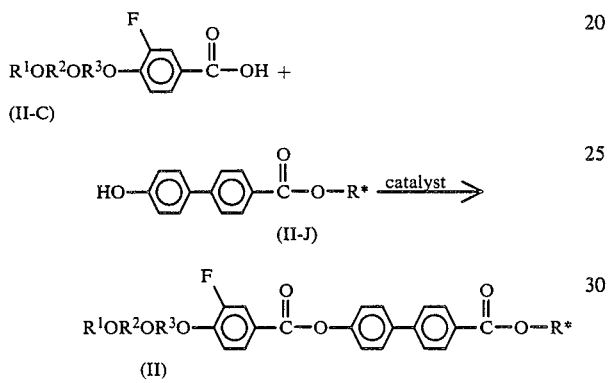

The esterification can be performed in a suitable organic solvent such as methylene chloride, using 1-(3-dimethlaminopropyl)-3-ethylcarbodiimide hydrochloride and 4-dimethylaminopyridine catalysts.

The formula (II-C) starting reactant can be prepared by reaction of an alkyl ester of 3-fluoro-4-hydroxybenzoic acid, formula (II-A) with a halo(alkoxyalkoxy)alkane, formula (I-A), using potassium carbonate and acetonitrile (MeCN) solvent; and saponification and acidification of the resulting ether compound, formula (II-B), to yield the formula (II-C) acid compound, as illustrated in the following reaction scheme:

The starting chiral ester represented by formula (II-J) can be prepared by a series of reactions by introducing a benzyl blocking group onto 4-hydroxy-4'-biphenyl-carbonitrile, formula (II-D), using potassium carbonate and acetonitrile solvent to provide 4-benzyloxy-4'-biphenyl-carbonitrile, formula (II-E); hydrolyzing the cyano group thereof to a carboxylic acid group, using sodium hydroxide and 2-methoxyethanol followed by acidification to provide the acid of formula (II-F); preparation of the corresponding acid chloride, using thionyl chloride and dimethylformamide, to provide the acid chloride compound of formula (II-G); reaction of the acyl chloride with a chiral alcohol, using pyridine and 4-dimethylaminopyridine (DMAP) catalyst, to provide the benzyl-blocked chiral ester of formula (II-H); and deblocking using hydrogen and palladium-on-carbon catalyst in ethyl acetate (EtOAc), to provide the chiral ester phenolic starting compound of formula (II-J). This series of reactions is illustrated by the following reaction schemes:

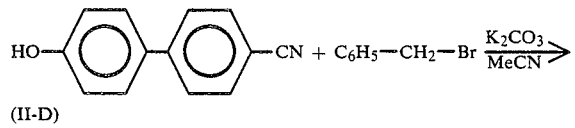

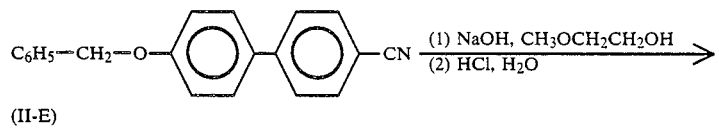

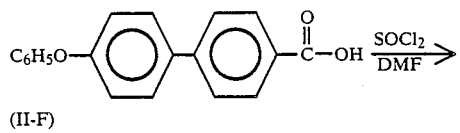

(II-F)

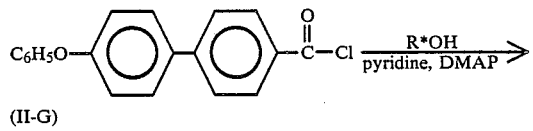

(II-G)

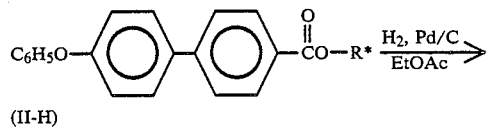

(II-H)

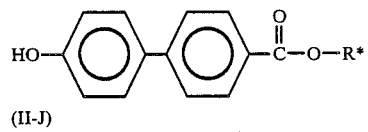

(II-J)

Formula (II) liquid crystal esters and methods for their preparation are described in the copending and commonly assigned application of William J. Cumming, et al., U.S. patent application Ser. No. 061,071, filed June 23, 1987.

Examples of Formula (II) liquid crystal esters useful in the formulation of mixtures according to the present invention include the following:

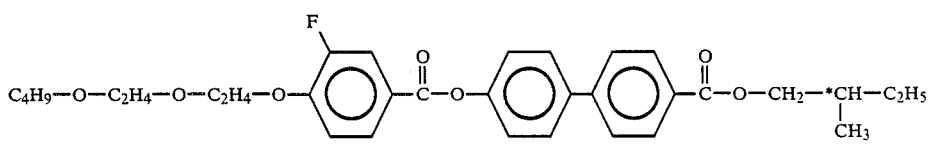

(X)

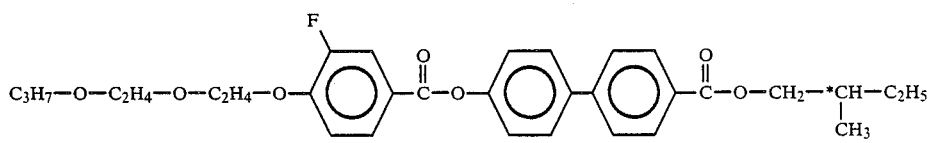

(XI)

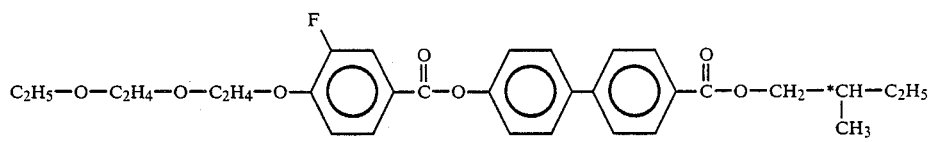

(XII)

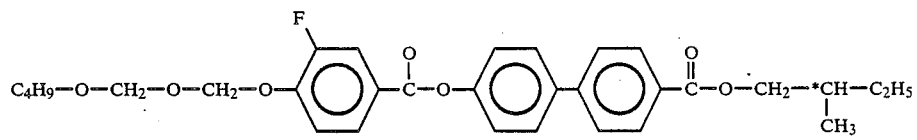

(XIII)

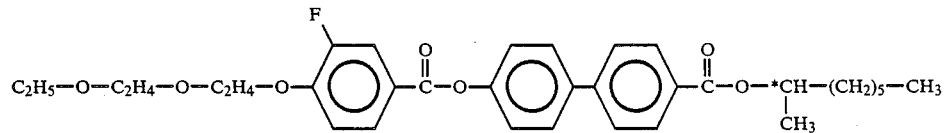

(XIV)

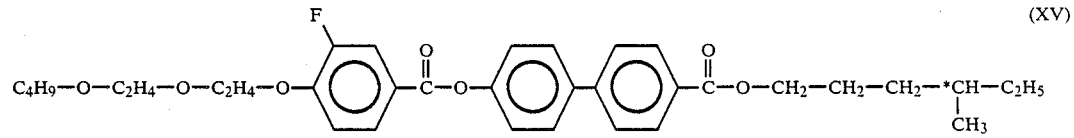

(XV)

Mixtures of the formula (I) and (II) liquid crystal esters provide a lower freezing point than is observed in the case of either of the formula (I) or (II) esters alone.

As used herein, the freezing point is the temperature at which the liquid crystal formula (I) or (II) ester, or mixture thereof, solidifies as the result of a phase transition which occurs on gradual lowering of temperature. Inasmuch as supercooling effects will frequently be observed on cooling, elimination of such effects and more accurate determination of freezing point may be obtained by lowering the temperature considerably below the observed freezing point, for example, to −40° C., and elevating the temperature gradually to determine a melting point, occuring at the transition of the crystalline phase to the smectic C mesomorphic phase.

The relative proportions of the formula (I) and (II) liquid crystal esters can vary within certain ranges consistent with an appreciable lowering of the freezing point compared to that observed in the case of either ester alone. The formula (I) and (II) esters are employed in a mole ratio of the formula (I) ester to the formula (II) ester of from about 98:2 to about 60:40. Preferably, the compounds will be employed, respectively, in a mole ratio of from about 88:12 to about 60:40.

In FIG. 1 is shown a phase diagram for mixtures of varying proportions of a formula (I) ester, 4-[(S)-2-methyl-1-butoxycarbonyl]-phenyl 4'-[2-(2-butoxyethoxy)ethoxy]-4-biphenylcarboxylate and a formula (II) ester, 4-[(S)-2-methyl-2-buytoxycarbonyl]-4'-biphenyl 3-fluoro-4-[2-(2-ethoxyethoxy)ethoxy]benzoate. From inspection of the curves, there can be seen a lowering in the transition temperature between the smectic C mesophase (Sc*) and the crystalline phase (K), as a result of mixing the formula (I) and (II) esters, as compared with the transitions observed in the case of either ester alone. Over the range of formula (I) to formula (II) ratios of from 98:2 to 60:40, a lowering of the smectic C to crystalline states is evident, and particularly in the range of from 88:12 to 60:40. It will be appreciated that the smectic C temperature range is considerably broadened by the combination of the formula (I) and (II) esters in the aforesaid ranges. The advantages of widened smectic C range are obtained, as shown in FIG. 1, without a substantial and concomitant lowering in the isotropic-smectic A and smectic A - smectic C transition temperatures.

The liquid crystal compositions of the invention can contain one or more ester compounds from each of the formula (I) and formula (II) classes. If desired, other compounds which do not conform to the formula (I) or formula (II) classes can be added to such mixtures. in this connection, liquid crystal compounds from a variety of classes can be added to the mixtures, provided that they do not materially and adversely affect the desired properties of such mixtures. A preferred ternary composition, for example, can be obtained by adding a third liquid crystal compound to a binary mixture of formula (I) and (II) esters having proportions which provide an optimal or near optimal lowered freezing point. In the case of the mixtures illustrates in FIG. 1, optimal results are obtained in a ratio of formula (I) to formula (II) esters of about 65:35, mole percent. Accordingly, a preferred ternary composition of the invention comprises a mixture of formula (I) and (II) liquid crystal esters in a mole ratio, respectively, of about 65:35, in combination with a third liquid crystal compound.

There can be added to a mixture of formula (I) and (II) esters a liquid crystal compound having the formula (XVI).

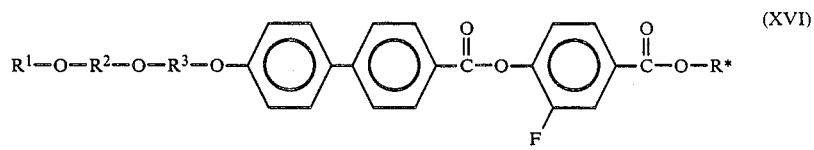

wherein each of $R^1$, $R^2$, $R^3$ and $R^*$ have the meanings previously defined. Preferably, $R^1$ will be alkyl of from 1 to 4 carbon atoms; each of $R^2$ and $R^3$ will be 1,2-ethylene; and $R^*$ will be a chiral group having the structure as shown in the formula (III). A preferred compound of the formula (XVI) ester class is the compound of the following formula (XVII):

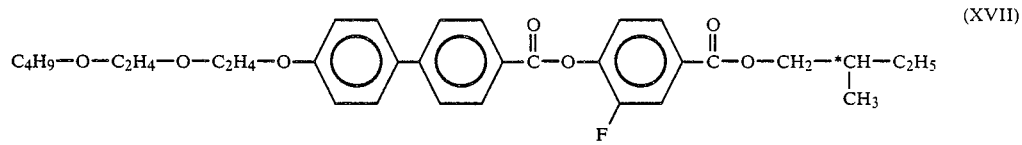

It has been found that the addition of the formula (XVII) ester to a mixture of formula (I) and (II) esters provides a further lowering of freezing point and greatly prolongs the storage stability of the binary mixture at low temperatures by protecting the mixture against the formation of crystallites or the tendency of impurities to separate on storage. Good results can be obtained, for example, by addition to a 65:35 by mole mixture of formula (I) and (II) esters, of a formula (XVI) ester in the ratio of the 65:35 mixture to the formula (XVI) ester of from 2:98 to 98:2 and preferably from 85:15 to 30:70.

Esters of formula (XVI) can be prepared by an esterification reaction according to the following sequence:

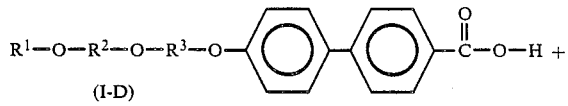

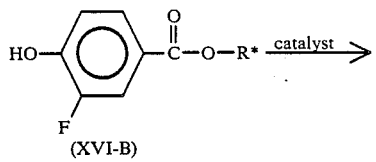

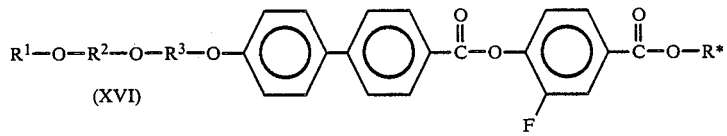

The 4'alkoxyalkoxyalkoxy-4-biphenyl-carboxylic acid starting compound of formula (I-D) can be prepared in the manner previously described. Compound (XVI-B) can be prepared according to the sequence illustrated previously for the preparation of compound (I-G), except using 3-fluoro-4-hydroxybenzoic acid (XVI-A), i.e., according to the following scheme:

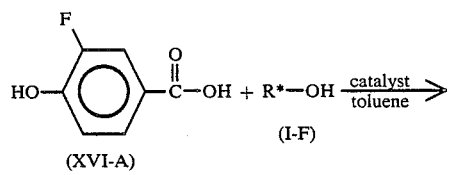

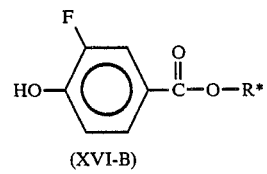

The following examples are intended to be illustrative and not limitative of the present invention.

EXAMPLE 1

This example illustrates the preparation of a formula (I) liquid crystal compound of formula (IV): 4-[(S)-2-methyl-1-butoxycarbonyl]-phenyl 4'-[2-(2-butoxyethoxy)ethoxy]-4-biphenylcarboxylate.

PART A

Preparation of methyl 4'-[2-(2-butoxyethoxy)ethoxy]-4-biphenylcarboxylate.

A mixture of 3.4 g (15 mmol) of methyl 4'-hydroxy-4-biphenylcarboxylate, 3.6 g (160 mmol) of 1-bromo-2-(2-butoxyethoxy)-ethane, 4.2 b g of powdered potassium carbonate and 300 mg of potassium iodide were heated in 35 ml of dimethylformamide for four hours at a temperature of from 125 to 130° C. The reaction mixture was poured slowly into 250 ml of ice water and left stirring for one-half hour. The resulting precipitate was collected by filtration, washed with water and dried in a vacuum oven at 40° C. overnight, yielding 5.3 g of crude product. The crude product (2.9 g) was extracted three times with 100 ml of boiling hexane and the combined hexane solutions were evaporated to a total volume of about 80 ml. A colorless solid (melting point, 90°-92° C.), weighting 2.1 g (72% yield) after standing for five hours at room temperature, was obtained. The mother liquid was concentrated to a volume of about 30 ml to provide an additional quantity of product in the amount of 0.26 g (9% yield). This portion, also a colorless solid, had a melting point of 91-93° C. The following structure of the desired product was confirmed by TLC, IR, NMR and mass spectral analyses.

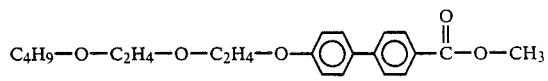

PART B

Preparation of 4'-[2-(2-butoxyethoxy)ethoxy]-4-biphenyl-carboxylic acid.

A mixture of two grams (5.4 mmol) of the ester product prepared as described in PART A of this example, two ml of 50% aqueous sodium hydroxide, 30 ml of methanol and ten ml of water was heated on a steam bath. A homogeneous solution was obtained. A colorless solid was observed to precipitate from the solution as methanol was removed by heating. Fifty ml of water were added and the suspension was left on a steam bath for two hours. The reaction mixture was diluted with water to a total volume of 300 ml, acidified with concentrated hydrochloric acid, heated to boil, and cooled in an ice-water-salt bath. The colorless precipitate was collected by filtration, washed with water and dried in a vacuum oven at 60° C. overnight, to provide 1.87 g (97% yield) of product having a melting point of 174°-176° C. and the following structure.

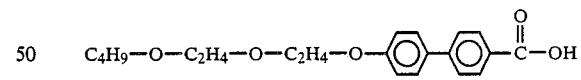

PART C

Preparation of (S)-2-methyl-1-butyl 4-hydroxybenzoate.

A mixture of 20.7 g of 4-hydroxybenzoic acid (150 mmol), 40 g of (S)-2-methyl-1-butanol (454.5 mmol) and 0.5 g of p-toluenesulfonic acid in 150 ml of toluene was refluxed overnight with a Dean Stark trap. A homogeneous solution was obtained. The solvent and excess alcohol were removed by vacuum distillation and the residue was purified by column chromatography through 200 g of silica gel (60°-200 mesh) using 2% methanol in methylene chloride as eluent. A total of 27.0 g (86% yield) of a light-yellow viscous liquid was collected. This liquid was vacuum distilled to provide 21.5 g (69% yield) of the desired product, having a boiling point of 140°–150° C. (0.2 mm) and the following structure.

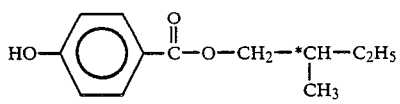

PART D

Preparation of 4-[(S)-2-methyl-1-butoxycarbonyl]-phenyl 4'-[2-(2-butoxyethoxy)ethoxy]-4-biphenyl-carboxylate.

To a 50-ml, round-bottom flask were added 1.284 g (3.58 mmol) of the acid product prepared as described in PART B of this example, 0.72 g (3.5 mmol) of the phenolic compound prepared as described in PART C of this example, 0.542 g (4.44 mmol) of catalyst 4-dimethylaminopyridine and 20 mls of methylene chloride. To this solution was added 0.833 g (4.35 mmol) of 1-(3)-dimethylaminopropyl)-3-ethylcarbodiimide hydrochloride. Thin layer chromatographic analysis of the reaction mixture after one hour showed substantial (approximately 50%) conversion. The reaction mixture was stirred overnight and filtered through a silica column. Additional fractions were obtained using methylene chloride and ether solvents through the column. Residues were obtained by evaporation of solvent in each instance and the residues were combined and recrystallized using a benzene/pentane mixture. The product was the ester having the following structure, confirmed by NMR and mass spectral analyses.

infrared, nuclear magnetic resonance and mass spectral analyses.

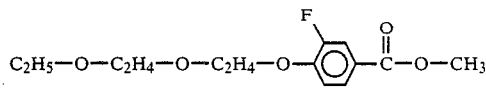

PART B

Preparation of 3-fluoro-4-[2-(2-ethoxyethoxy)-ethoxy]-benzoic acid.

Into a 500-ml roundbottom flask equipped with magnetic stirrer, heating mantle and condenser were placed 3.15 g of the benzoate ester product prepared as described in PART A of this example, 6 ml of 50% aqueous sodium hydroxide solution and 150 ml of methanol. The reaction mixture was stirred under reflux for three hours. Methanol was distilled off (100 mls) and water (600 ml) was added. The reaction mixture was acidified with hydrochloric acid. After cooling to 0° C., a white solid precipitate was obtained. The white solid was filtered and set aside. The filtrate was extracted with methylene chloride and the extracted material was evaporated to a white solid which was combined with the set-aside material. The combined material was dried under vacuum to yield 2.82 g of product (94% yield) having a melting point of 67°–68° C. The following structure was confirmed by TLC, NMR, IR and mass spectral analyses.

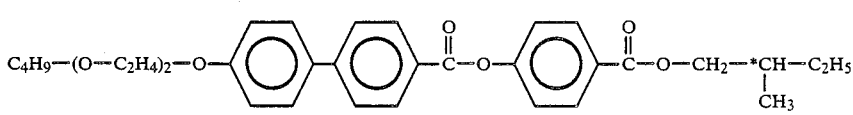

(IV)

EXAMPLE 2

The example illustrates the preparation of a formula (II) liquid crystal ester having the formula (XII): 4-[(S)-2-methyl-1-butoxycarbonyl]-4'-biphenyl 3-fluoro-4-[2-(2-ethoxyethoxy)ethoxy]benzoate.

PART A

Preparation of methyl 3-fluoro-4-[2-(2-ethoxyethoxy)-ethoxy]-benzoate.

Into a 500-ml, round-bottom flask equipped with a magnetic stirrer, heating mantle and condenser were placed 5.7 g (33.5 mmol) methyl 3-fluoro-4-hydroxybenzoate, 8.5 g (43.2 mmol) 1-bromo-2-(2-ethoxyethoxy)-ethane, 23.2 g of powdered anhydrous potassium carbonate and 350 ml acetonitrile. After stirring the reaction mixture under reflux for four hours, TLC analysis showed that none of the phenolic starting material remained. Three hundred ml of the acetonitrile was then distilled off and 300 ml dichloromethane was added. The reaction mixture was filtered through Celite and the solids were washed thoroughly with dichloromethane. Evaporation of the filtrate yielded product in the form of a yellow oil. Purification by flash chromatography on silica gel with 4% diethyl ether in dichloromethane, followed by low temperature recrystallization from pentane, yielded 8.55 g of white crystals, 89%, m.p. 33–36.5° C. The structure was confirmed by

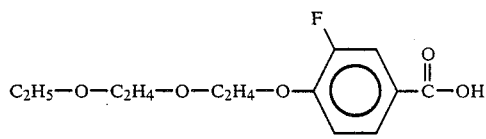

PART C

Preparation of 4-benzyloxy-4'-bi-phenylcarbonitrile.

In a 250-ml, three-necked, roundbottom flask equipped with a magnetic stirrer, heating mantle, thermometer, and condenser were placed 1.76 g (9.0 mmol) 4-hydroxy-4'-biphenylcarbonitrile, 3.94 g (28.5 mmol) powdered anhydrous potassium carbonate, 1.18 ml (9.92 mmol) α-bromotoluene, and 150 ml acetonitrile. After stirring the mixture under reflux for two hours, TLC analysis showed that none of the phenolic starting material remained. Two-thirds of the acetonitrile was then distilled off, and 200 ml dichloromethane was added. The mixture was filtered through Celite and the solids were washed thoroughly with dichloromethane. Evaporation of the filtrate yielded white crystals which were purified by recrystallization from methanol. 2.17 g (84.4%) of product was obtained; mp 150°–151.5° C. The following structure was confirmed by infrared, nuclear magnetic resonance, and mass spectral analyses.

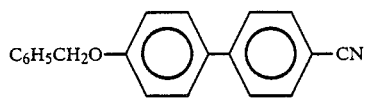

PART D

Preparation of 4-benzyloxy-4'-biphenylcarboxylic acid.

In a 250-ml, three-necked, round-bottom flask equipped with a magnetic stirrer, heating mantle, thermometer, and condenser were placed 1.59 g (5.57 mmol) 4-benzyloxy-4'-biphenylcarbonitrile, 15 g sodium hydroxide pellets, and 150 ml 2-methoxyethanol. The mixture was stirred under reflux overnight, then two-thirds of the 2-methoxyethanol was distilled off and 400 ml water was added. After acidification, the product was filtered, washed with water, and dried under vacuum to yield 1.69 g (100%) of 4-benzyloxy-4'-biphenylcarboxylic acid mp>305° C., whose structure was confirmed by mass spectral analysis, as follows.

PART E

Preparation of 4-benzyloxy-4'-biphenylcarbonyl chloride.

In a 100-ml, three-necked, round-bottomed flask equipped with a magnetic stirrer, an oil bath, and a condenser topped with a drying tube were placed 1.69 g of 4-benzyloxy-4'-biphenylcarboxylic acid, 34 ml of thionyl chloride, and one drop of dimethylformamide. After stirring the solution for three hours under reflux, the thionyl chloride was distilled off, then 75 ml tetrachloromethane was added and distilled. The brown solid was dissolved in 500 ml hot dichloromethane, and the solution was treated with charcoal and filtered through Celite. The solids were washed with hot dichloromethane, and the filtrate was evaporated, to yield the following compound.

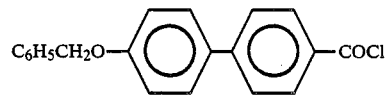

PART F

Preparation of (S)-2-methyl-1-butyl 4-benzyloxy-4'-biphenylcarboxylate.

In a 100-ml, threenecked, round-bottom flask equipped with a magnetic stirrer and thermometer were placed 3.2 g (36.3 mmol) (S)-(-)-2-methyl-1-butanol, 14 ml distilled pyridine, and a catalytic amount of 4-dimethylaminopyridine (DMAP). After cooling the flask to 0° C. under nitrogen, 1.2 g (3.72 mmol) 4-benzyloxy-4'-biphenylcarbonyl chloride was added and the mixture was stirred for three days at room temperature. It was then poured into 50 ml ice water and extracted with dichloromethane. The organic phase was extracted with 10% aqueous hydrochloric acid, dried over sodium sulfate, filtered, and evaporated to a light brown solid. Purification by flash chromatography on silica gel with dichloromethane followed by low-temperature recrystallization from pentane yielded white crystals (0.99 g, 71.2%, mp 95.5°14 97.5° C.) whose structure was confirmed by infrared, nuclear magnetic resonance, and mass spectral analyses, as follows.

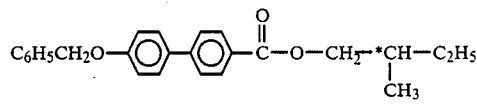

PART G

Preparation of (S)-2-methyl-1-butyl 4-hydroxy-4'-biphenylcarboxylate.

In a 125-ml Parr bomb equipped with a magnetic stirrer were placed 960 mg (S)-2-methyl-1-butyl 4-benzyloxy-4'-biphenylcarboxylate, 200 mg 5% palladium on carbon, and 50 ml ethyl acetate. The bomb was purged with argon and pressurized with 500 psi hydrogen. After stirring at room temperature for one day, thin layer chromatographic analysis showed that considerable starting material remained. An additional 200 mg 5% palladium on carbon was carefully added, and the bomb was re-pressurized with 500 psi hydrogen. After stirring for one more day, TLC analysis showed that the reaction was complete. The reaction mixture was filtered through Celite and the solids were washed thoroughly with ethyl acetate. Evaporation of the solvent yielded white crystals which were recrystallized from hexanes at low temperature to yield 0.62 g (85%) of product, mp 111.5°14 113° C., whose structure was confirmed by infrared, nuclear magnetic resonance, and mass spectral analyses, as follows.

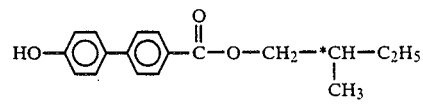

PART H

Preparation of 4-[(S)-2-methyl-1-butoxycarbonyl]-4'-biphenyl 3 fluoro-4-[2-(2-ethoxy ethoxy)-ethoxy]-benzoate.

Into a 250-ml, round-bottom flask equipped with a magnetic stirrer, were placed 2.82 (10.36 mmol) of 3-fluoro-4-[2-(ethoxyethoxy)-ethoxyl-benzoic acid and 2.8 g (9.8 mmol) of the phenolic reactant, (S)-2-methyl-1-butyl 4-hydroxy-4'-biphenylcarboxylate, obtained respectively in the manners described in PARTS B and G of this example, 0.63 g (5.16 mmol) of catalyst 4-dimethylaminopyridine, and 2.8 g (14.61 mmol) of 1-(3-dimethylaminopropyl)-3-ethylcarbodiimide hydrochloride. The solids were washed in 90 ml of methylene chloride (dried over 5A molecular sieves). The reaction mixture was stirred at room temperature for 65 hours. This layer chromatographic analysis of the reaction mixture showed no phenolic reactant present. Flash chromatography was performed and fractions of desired product were combined and evaporated to provide a yellow oil containing crystalline material. The product was recrystallized from pentane with cooling in dry ice to yield 3.73 g (71% yield) of product having a melting point of 75.5°–77° C. and the following structure confirmed by NMR and mass spectral analyses.

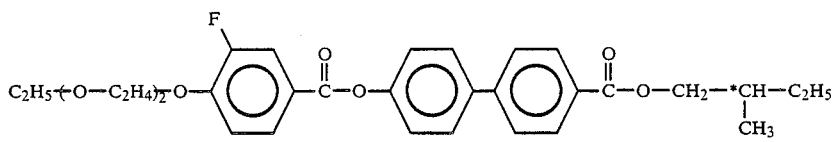
(XII)

EXAMPLE 3

This example illustrates the preparation of 2-fluoro-4-[(S)-2-methyl-1-butoxycarbonyl]-phenyl 4'-[2-(2-butoxyethoxy)ethoxy]-4-biphenylcarboxylate.

PART A

Preparation of (S)-2-methyl-1-butyl 3-fluoro-4-hydroxybenzoate.

In a 250-ml, round-bottomed flask equipped with a heating mantle, magnetic stirrer, condenser and Dean Stark trap, were placed 2.5 g (16.0 mmol) of 3-fluoro-4-hydroxybenzoic acid, ten g (113.4 mmol) of (S)-2-methyl-1-butanol, 0.347 g of p-toluenesulfonic acid monohydrate and 100 ml of benzene. The reaction mixture was stirred overnight under reflux. The reaction mixture was extracted using saturated aqueous sodium bicarbonate. The organic phase was dried over sodium sulfate, filtered through cotton and evaporated to an oil. The product was purified by flash chromatography on silica gel with 3% diethyl ether in dichloromethane. Fractions containing the desired product were combined and evaporated to a pale-yellow oil. Analysis by NMR showed that considerable starting alcohol remained. The oil was placed under vacuum (at 70° C.) for two days. No alcohol was shown by gas chromatography to be present. The desired product was obtained in the amount of 2.39 g (66% yield) and had the following structure.

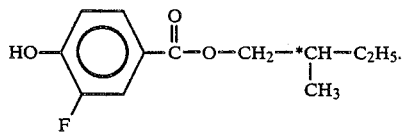

PART B

Preparation of 4'-[2-(2-butoxyethoxy)ethoxy]-4-biphenylcarboxylic acid.

Using the procedure set forth in PARTS A AND B of EXAMPLE 1, the captioned carboxylic acid product was obtained.

PART C Preparation of 2-fluoro-4-[(S)-2-methyl-1-butoxycarbonyl]-phenyl 4'-[2-(2-butoxyethoxy)-ethoxy]-4-biphenylcarboxylate.

To a 50-ml, round-bottom flask were added 1.037 g (4.58 mmol) of the phenolic compound obtained from the conduct of PART A of this example, 1.697 g (4.73 mmol) of the acid compound described in PART B of this example, 0.784 g (6.42 mmol) of catalyst 4-dimethylaminopyridine, and 15 ml of methylene chloride. After dissolution of the reactants, 1.039 g (5.42 mmol) of 1-(3-dimethlaminopropyl)-3-ethylcarbodiimide hydrochloride was added. The reaction mixture was stirred overnight and filtered through 20 g of silica. Using methylene chloride and ether solvents, additional fractions were obtained. Recovery of the fractions by solvent evaporation in each instance and combination of the frictions yielded a solid material which was recrystallized from a benzene/hexane mixture and which had the following structure.

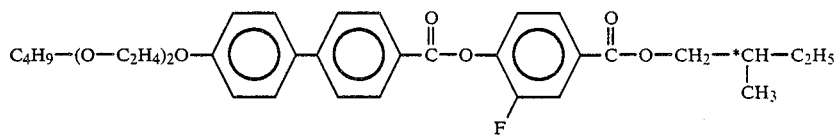

EXAMPLE 4

This example illustrates the preparation of binary mixtures of a formula (I) ester and a formula (II) ester.

Binary liquid crystal mixtures were prepared (in various molar ratios reported in TABLE 1) using a formula (I) type of liquid crystal ester having the formula (IV) shown in Example 1, and a formula (II) type of liquid crystal ester having the formula (XII) shown in Example 2. Each of the mixtures was evaluated for determination of the temperatures at which phase transitions occurred. This was accomplished by first heating to the isotropic state and then lowering the temperature of each sample to a temperature of −40° C., i.e., to a temperature below the smectic C - crystalline transition temperature. The temperature was then gradually elevated and the temperature of each observed phase transition was recorded using differential scanning calorimetry. For purposes of comparison, the same evaluation was performed on each of the individual compounds, i.e., compounds (IV) and XII), used in the mixtures. The various mixtures and the weight ratios of the components thereof are identified in TABLE 1 along with a recordation of the crystalline - smectic C (K-S) phase transition temperature, the smectic C - smectic A ($S*_C$-$S_A$) phase transition temperature, and the difference (Δ) indicative of the temperature range of the smectic C mesomorphic phase.

TABLE 1

| MIXTURE | Molar Ratio (IV)/(XII) | PHASE TRANSITION TEMPERATURES (in °C.) | | |
|---|---|---|---|---|
| | | K-$S_C$ | $S_C^*$-$S_A$ | Δ |
| A | 100/0 | 28.5 | 91.1 | 62.6 |
| B | 90.5/9.5 | −10.0 | 84.6 | 94.6 |
| C | 80/20 | −24.3 | 82.2 | 106.5 |
| D | 71.3/28.7 | −31.0 | 77.2 | 108.2 |
| E | 68.4/31.6 | −34.4 | 70.9 | 105.3 |
| F | 64.8/35.2 | −33.6 | 73.3 | 106.9 |

TABLE 1-continued

| MIXTURE | Molar Ratio (IV)/(XII) | PHASE TRANSITION TEMPERATURES (in °C.) | | |
|---|---|---|---|---|
| | | K-$S_C$ | $S_C^*$-$S_A$ | Δ |
| G | 61.8/38.2 | −31.6 | 74.6 | 106.2 |
| H | 58.7/41.3 | 25.0 | 75.1 | 50.1 |
| I | 47.4/52.6 | 52.1 | 69.7 | 17.6 |
| J | 40/60 | 57.8 | 70.6 | 12.8 |
| K | 31.69 | 61.7 | 70.5 | 8.8 |
| L | 20/80 | # | # | NA |
| M | 0/100 | # | # | NA |

\# no $S_C^*$ phase observed
NA (Not Applicable)

In FIG. 1 is shown a series of plots showing the phase transition temperatures obtained by the described method. The uppermost plot shows the transition between the smectic A and isotropic phases. The intermediate plot shows the transition between the smectic C and smectic A phases while the lowermost plot shows the transition between the crystalline and smectic C phases. In FIG. 1, the presence of a cholesteric (Ch) phase may be noted in the case of the compound of formula (XII). This phase occurs between the smectic A and isotropic phases. From FIG. 1, there can be seen a substantial lowering of freezing temperature by employing mixtures of the formula (IV) and formula (XII) compounds, compared with either compound alone.

EXAMPLE 5

Figure 2:
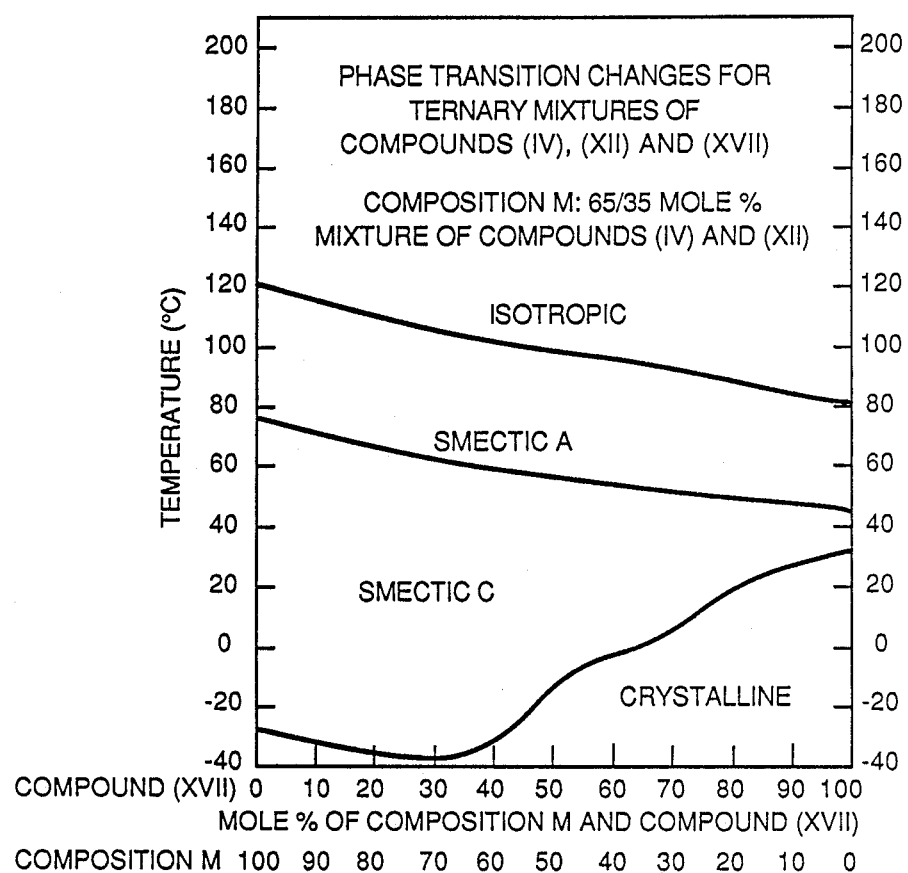
FIG. 2 shows a phase diagram for a mixture of three liquid crystal compounds formed by adding a third liquid crystal compound to a binary mixture having a minimum freezing point determined from FIG. 1.

A series of ternary compositions was prepared by combining an ester compound of formula (XVII) in varying proportions with a binary 65:35 by mole % mixture of the formula (IV) and (XII) compounds. The 65:35 mixture was selected as approximately the lowest freezing temperature achievable in the case of mixtures of compounds (IV) and (XII). The 65:35 mixture is referred to hereafter as Composition M. The single compound of formula (XVII) is referred to as Compound (XVII). Each of the mixtures, and Composition M and Compound (XVII), were evaluated in the manner described in EXAMPLE 4. In FIG. 2 is shown a representation of various observed transitions. It can be seen that a lowering of freezing temperature is obtained from mixtures of Composition M and Compound (XVII), compared with either alone.

What is claimed is:

1. A liquid crystal composition exhibiting a smectic C mesomorphic phase and comprising a mixture of liquid crystal ester compounds, said mixture comprising
at least one ester compound from each of the classes of ester compounds having, respectively, the following first and second formulas

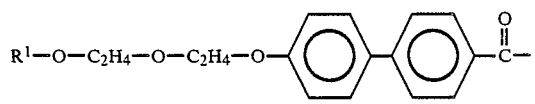

-continued

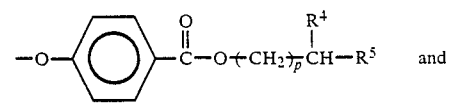

and

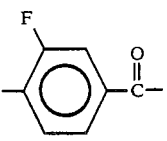

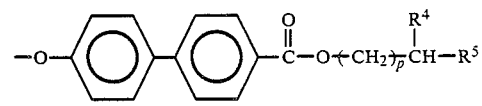

wherein, in each of said first and second formulas, $R^1$ has from 1 to 4 carbon atoms,

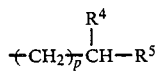

p is zero or one, and $R^4$ and $R^5$ are dissimilar alkyl groups, said first and second formula esters being present in said liquid crystal composition in a molar ratio, respectively, of from 98:2 to 60:40.

2. The liquid crystal composition of claim 1 wherein in each of said first and second formulas said p is one, $R^4$ is methyl and $R^5$ is ethyl.

3. The liquid crystal composition of claim 2 wherein $R^1$ in said first formula ester is n-butyl and $R^3$ in said second formula ester is ethyl.

4. The liquid crystal composition of claim 3 wherein the ratio of said first and second formula esters is from about 88:12 to about 60:40.

5. The liquid crystal composition of claim 4 wherein said ratio is about 65:35.

6. The liquid crystal composition of claim 1 additionally including a liquid crystal ester compound of the following third formula

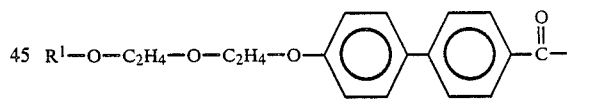

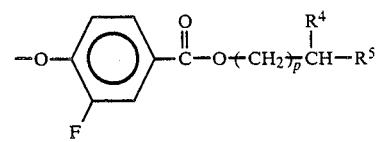

wherein $R^1$ is alkyl of from 1 to 4 carbon atoms, p is zero or one and $R^4$ and $R^5$ are dissimilar alkyl groups.

7. The liquid crystal composition of claim 6 wherein in said third formula ester, $R^1$ is n-butyl, p is one, $R^4$ is methyl and $R^5$ is ethyl.

8. The liquid crystal composition of claim 7 wherein the ratio of the sum of said first and second formula esters to said third formula ester is in a mole ratio of from 2:98 to 98:2.

9. The liquid crystal composition of claim 8 wherein said ratio is in the range of from 85:15 to 30:70.

* * * * *